(12) United States Patent
Harris

(10) Patent No.: US 8,990,003 B1
(45) Date of Patent: Mar. 24, 2015

(54) GLOBAL POSITIONING SYSTEM WITH INTERNET CAPABILITY

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 2185 days.

(21) Appl. No.: 11/696,557

(22) Filed: Apr. 4, 2007

(51) Int. Cl.
  *G01C 21/00* (2006.01)

(52) U.S. Cl.
  USPC ............................................. 701/400

(58) Field of Classification Search
  USPC ......... 701/420, 421, 451–453, 483, 400, 414, 701/423, 465, 482
  See application file for complete search history.

(56) References Cited

U.S. PATENT DOCUMENTS

| | | | | | |
|---|---|---|---|---|---|
| 5,164,904 | A | * | 11/1992 | Sumner | 701/117 |
| 5,559,707 | A | * | 9/1996 | DeLorme et al. | 701/467 |
| 5,808,566 | A | * | 9/1998 | Behr et al. | 340/995.12 |
| 6,014,090 | A | * | 1/2000 | Rosen et al. | 340/905 |
| 6,047,234 | A | * | 4/2000 | Cherveny et al. | 701/451 |
| 6,119,095 | A | * | 9/2000 | Morita | 705/5 |
| 6,122,520 | A | | 9/2000 | Want et al. | |
| 6,124,826 | A | * | 9/2000 | Garthwaite et al. | 342/357.46 |
| 6,131,066 | A | * | 10/2000 | Ahrens et al. | 701/532 |
| 6,138,142 | A | * | 10/2000 | Linsk | 709/203 |
| 6,182,006 | B1 | * | 1/2001 | Meek | 701/538 |
| 6,263,276 | B1 | * | 7/2001 | Yokoyama et al. | 701/420 |
| 6,278,941 | B1 | * | 8/2001 | Yokoyama | 701/420 |
| 6,321,227 | B1 | * | 11/2001 | Ryu | 1/1 |
| 6,339,397 | B1 | | 1/2002 | Baker | |
| 6,366,849 | B1 | * | 4/2002 | Rychlak | 701/420 |
| 6,401,035 | B2 | * | 6/2002 | Jin | 701/410 |
| 6,427,115 | B1 | * | 7/2002 | Sekiyama | 701/526 |
| 6,459,986 | B1 | * | 10/2002 | Boyce et al. | 701/533 |
| 6,490,521 | B2 | * | 12/2002 | Wiener | 701/443 |
| 6,525,768 | B2 | * | 2/2003 | Obradovich | 348/231.99 |
| 6,526,349 | B2 | * | 2/2003 | Bullock et al. | 701/420 |
| 6,581,001 | B1 | * | 6/2003 | Katsuka et al. | 701/424 |
| 6,608,556 | B2 | * | 8/2003 | De Moerloose et al. | 340/501 |
| 6,622,083 | B1 | * | 9/2003 | Knockeart et al. | 701/533 |
| 6,731,612 | B1 | * | 5/2004 | Koss | 370/310 |
| 6,741,188 | B1 | * | 5/2004 | Miller et al. | 340/995.1 |
| 6,816,778 | B2 | * | 11/2004 | Diaz | 701/465 |
| 6,834,229 | B2 | * | 12/2004 | Rafiah et al. | 701/533 |
| 6,868,337 | B2 | * | 3/2005 | Muramatsu | 701/431 |
| 6,950,745 | B2 | * | 9/2005 | Agnew et al. | 701/414 |
| 7,043,356 | B2 | * | 5/2006 | Linn | 701/411 |
| 7,151,997 | B2 | * | 12/2006 | Uhlmann et al. | 701/409 |
| 7,493,210 | B2 | * | 2/2009 | Nassiff et al. | 701/532 |
| 2001/0020213 | A1 | * | 9/2001 | Hatano | 701/207 |
| 2001/0029425 | A1 | * | 10/2001 | Myr | 701/200 |
| 2002/0156572 | A1 | * | 10/2002 | Bullock et al. | 701/209 |
| 2003/0093419 | A1 | * | 5/2003 | Bangalore et al. | 707/3 |
| 2003/0229444 | A1 | * | 12/2003 | Bullock et al. | 701/202 |
| 2003/0229746 | A1 | * | 12/2003 | Liu et al. | 710/301 |
| 2004/0102197 | A1 | | 5/2004 | Dietz et al. | |
| 2005/0165543 | A1 | * | 7/2005 | Yokota | 701/204 |
| 2005/0198201 | A1 | * | 9/2005 | Bohn et al. | 709/218 |
| 2005/0198567 | A1 | * | 9/2005 | Vermeulen et al. | 715/513 |
| 2006/0047417 | A1 | * | 3/2006 | Tanabe | 701/204 |
| 2006/0161343 | A1 | * | 7/2006 | Agnew et al. | 701/211 |
| 2007/0064644 | A1 | | 3/2007 | Dowling et al. | |
| 2007/0094267 | A1 | * | 4/2007 | Good et al. | 707/10 |

* cited by examiner

*Primary Examiner* — Bhavesh V Amin

(74) *Attorney, Agent, or Firm* — Law Office of Scott C. Harris, Inc.

(57) ABSTRACT

A webpage for a GPS device enables sending information automatically to the GPS device. The user can search on the search engine, and receive results. The results in the form of addresses or named in the automatically exported to the GPS device. The exporting may be wirelessly or via a portable hard drive.

16 Claims, 2 Drawing Sheets

GLOBAL POSITIONING SYSTEM WITH INTERNET CAPABILITY

BACKGROUND

Global positioning systems "GPS"s enable a user to find their current location. A GPS with a mapping function may store map data that guides a user to their destination. Different types of GPS units exist, including handheld GPS, portable GPS, and built-in GPS. A handheld GPS is are often integrated with a communication device such as a cell phone or a PDA. The handheld GPS may also have Internet access via the cellular or wifi connection in the unit.

GPS units may also include the capability of receiving alternative transmissions. For example, a portable GPS and car mounted GPS may receive supplemental transmissions either via satellite or via some alternative in the end, that includes traffic information. The traffic information, for example, may be transmitted on a low bandwidth channel, in some kind of text format, and maintained within the GPS.

SUMMARY

The present application describes exporting of information from an internet based device to a GPS.

One aspect describes exporting address information to the GPS.

Embodiments describe how an Internet webpage with a mapping database, is associated with information that can individually identify GPSs within the mapping database. The user can then transfer or send any information indicative of their mapped location to the individual GPS device.

Different transfer embodiments are disclosed.

BRIEF DESCRIPTION OF THE DRAWINGS

These and other aspects will now be described with reference to the accompanying drawings, in which.

DETAILED DESCRIPTION

Figure 1:
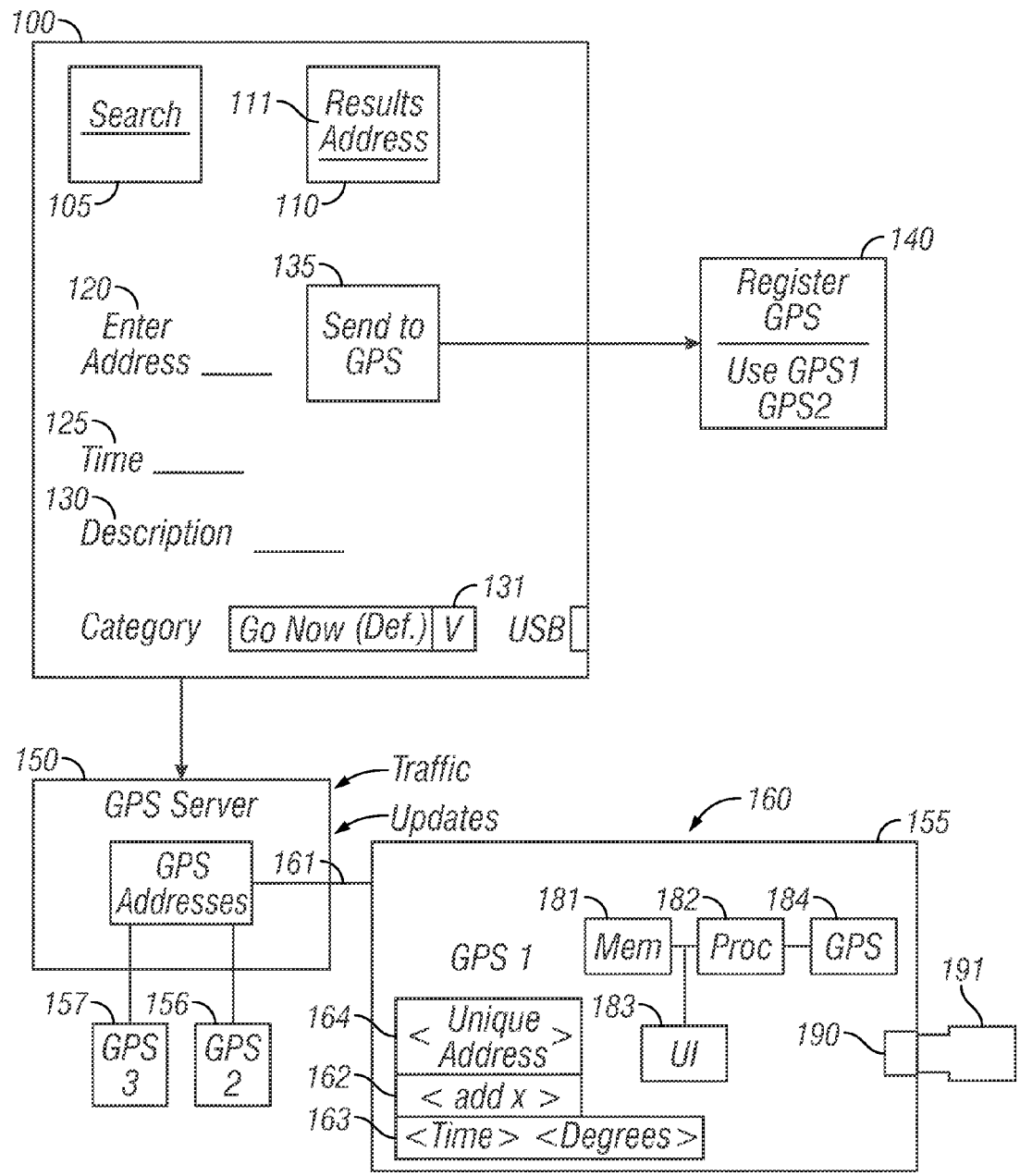
FIG. 1 illustrates an embodiment with a webpage, and transfer of information to the GPS device.

An embodiment is shown in FIG. 1. 100 represents a webpage, which may be either a webpage that is specific for the GPS device, or may be a webpage of a third party such as MapQuest or any other mapping webpage, or a restaurant or other business selection page such as "signon" or the like. The webpage may alternatively be a search engine, such as a search engine which enables finding information about any restaurants. These search engines often return maps to the restaurant, as well as street addresses and phone numbers. The web page may preferably include the ability to search names and/or maps. A user, for example, may enter a restaurant name and/or type and/or location, and receive results 110. Any of the results may include a clickable address such as 111. Alternatively, an address can be manually entered in an entry field such as 120.

In the embodiment, a time can also be entered in filed 125 and also a description may be entered in 130. A category may be selected from a pull down list 131. Categories may include, 'go now' (default), 'save for later', 'add to favorites', 'go to restaurant', 'go to store', or other categories that can be saved as folders or the like on the GPS.

A separate control, e.g., button 135 commands that the currently-selected place and information be sent to the GPS. This may send information indicative of the current place to the default GPS. If more information is needed, e.g., there is no the default GPS, or more than one GPS, then the send to GPS button 135 may bring up a supplemental page shown as 140. The supplemental page may be a pop-up window such as a pop-up window, or may be a totally separate webpage. This page may allow a user to register GPS devices or use one of their already registered GPS devices to receive the information. This may enable the user to select, for example, GPS 1, selection 140. This causes the information to be sent to a GPS server shown as 150. The GPS server may be a dedicated server that is maintained by the maker of the GPS, or alternatively can be any server that has the ability of making a communication capability with the GPS.

The GPS devices are shown as 155, 156, 157. each GPS includes, as conventional, a memory 181 that stores mapping data, favorites, and other stored information. The memory may also store media information such as MP3s, pictures, or videos. In this embodiment, the memory may also store downloaded information, such as information from the webpage. In other embodiments, the memory stores other information. A processor 182 carries out mapping, such as mapping from the user's current location determined from the GPS satellite information 184 to a desired location. A user interface 183 enables the user to enter desired locations and other information.

A GPS device includes a unique address 164, which may be its serial number or any other information that enables communication with the GPS. In this way, any GPS can be identified by its unique address. Each of the GPS devices receives satellite information. GPS 155, for example, is shown as receiving satellite information 160.

In an embodiment, the GPS devices also receives a supplemental communication. The supplemental communication channel shown as 161 may be the same channel over which the GPS devices receive traffic information. For example, this may be a low bandwidth channel which sends text messages. It may be one like the "traffic message channel" used by the "Total Traffic Network", or some other similar channel. The traffic channel may send a number of text messages or messages in, for example, XML format, where each XML tag represents the specific kind of information that is being sent.

In the embodiment, messages that are directed to the GPS may also be sent over this channel. For example, a message that is directed to a specific GPS may include a header such as in XML tag that includes the GPS is unique device as the header. Only that specific GPS device will then respond to that specific XML tag.

The message may be in the form of unique address shown as 161 followed by an address x shown as 162. The address may be input purely in text form, and cause the address X to be automatically imported into, and stored within, the GPS.

In addition, the message may include supplemental information shown as 163 which may include a time or description. The description, for example, may be "lunch" or may be "dinner Thursday".

According to another embodiment, multiple 'go now' destinations may be sent to the GPS device. Either the server 150 or the GPS device itself 155 can then decide an order for visiting the destinations. For example, the user might indicate they are going to Wal-Mart, having lunch at a specified location, and home as another destination, with a time of three o'clock. The order and timing of destinations may then be set in the device. For example, if the word lunch appears, the GPS device may set the order of the destinations so that the user will be at the lunch destination some time between 12 and 1. The user may also set a specified time in which case the user will be sent to the device at the specified time.

In the embodiment, the information is sent from the server 150 that hosts or is associated with the webpage 100 to the GPS device over the traffic channel. It should be understood, that alternative channels can also be used.

If the device has Internet access, for example over the cellular network or wifi, the cellular network can be used to send the information.

The information can be sent over the satellite link 160.

In addition to the wireless communication channels that have been described above (traffic, cellular, WiFi, satellite, and others) an additional embodiment may use a wired connection a the GPS device may include a USB port 190, and the information can be saved on a USB hard drive or other kind of drive 191 that is inserted into the port 190. The GPS device 155 may be programmed to automatically read address information off of the drive 191, and automatically import it. In one embodiment, after importing the information, the information is either removed from the drive 191, or marked as already imported to avoid duplicate importations.

Any channel can be used although the channel that is already used to send traffic information may be preferred. Also, while it is preferred that the information be automatically imported into the GPS device and automatically entered into one of the lists within the GPS device (such as favorites, previous destinations or the like) it may also be possible to prompt the user before entering this data. Both automatically importing, and prompting the user before importing the information are both considered to the automatic transferring, since the user does not need to type in the information again.

Also, the communication need not be instantaneous. When a user sends a destination to their GPS, the present system recognizes that there is typically at least a 10 minute delay, and often much more, before the user actually gets to their car and uses their GPS. Therefore, sending this information over a low bandwidth channel, for example a 28.8 Kbaud channel, is perfectly acceptable and enables avoiding any problems that could otherwise be associated with trying to send the information in real time. The user typically does not need the information to get to their GPS in real time.in one embodiment, for example, the sending to the GPS may be delayed, for example by two minutes or more, more preferably by five minutes or more. It will take the user at least as long to get from their location to the GPS.

Figure 2:
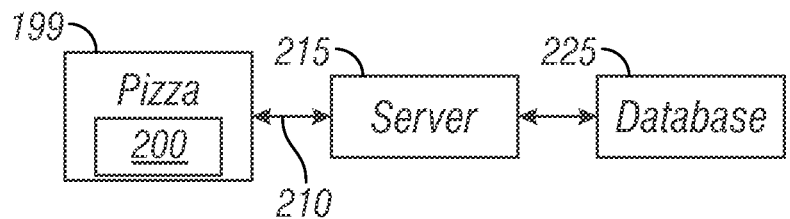
FIG. 2 illustrates an embodiment where information about destinations is retrieved from a server and displayed.

Another embodiment is shown in FIG. 2. In this embodiment, the user can search for certain kinds of services, and receives supplemental information on their GPS device, either over a high-bandwidth channel or a low bandwidth channel. In the embodiment, the user may be using their GPS to search for a local service. The user uses the virtual keypad on the GPS 200 to enter a word, here pizza. The word pizza is used to search in the GPS's internal memory for any matches. However, this will likely only match a restaurant that has the word pizza in it. Even a word such as pizzeria may not match directly to pizza. If no matches to the word pizza are found, or if a manual request for more information is sent, then the GPS sends a service exception call over the channel 210 to the server 215. The service exception call 210 includes the search term, and also includes information indicative of the GPS device's current location.

Based on pre-stored parameters, for example a 10 Minute Drive, the server searches its own database 225 to look for restaurants that serve pizza within the local area. Any responses are sent back to the device 199. While this kind of searching over a low bandwidth channel may take some time, it still produces better results.

Figure 3A:
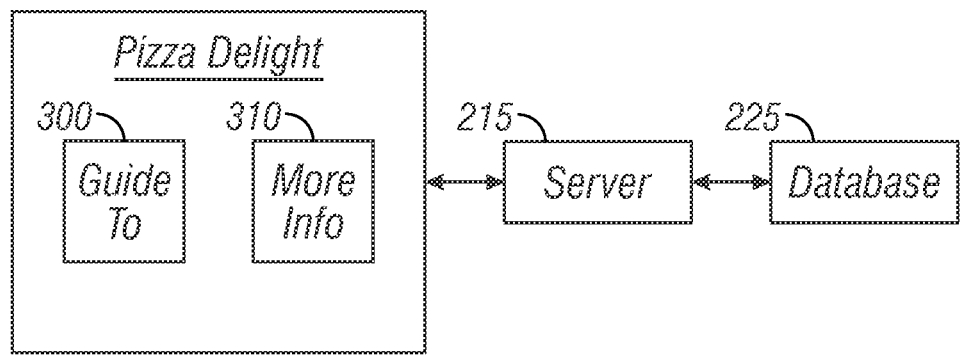
FIGS. 3A and 3B show an embodiment where supplemental information about the destinations, such as menus, can be displayed on the GPS device.
Figure 3B:
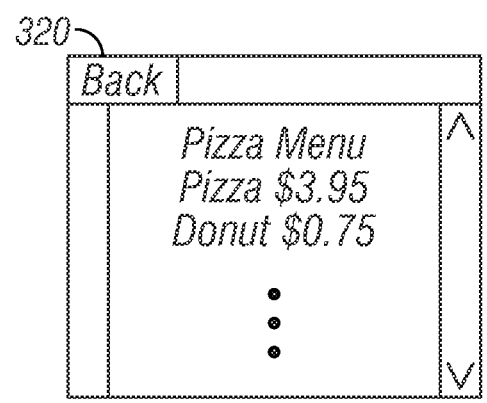

Another embodiment, shown in FIG. 3 allows a user to select a name of a local restaurant, e.g., by entering it, or selecting from a list. Different options are shown on the menu, as conventional, the guide- to button 300, and the other buttons. Another button may include a more information button 310. For more information button causes the information to be sent to the server 215. The server contacts its local database and returns whatever information it may have about the selected restaurant. For example, the server may have a full or partial menu. If the menu is available, it is displayed as shown in figure FIG. 3B. This illustrates the displayed menu, displayed on the same screen that usually displays the GPS. The entire menu may be displayed in this way. The screen also includes a back button, shown as 320, which allows going back to the screen shown in FIG. 3A.

An advantage of this system is that a user can see the menu before going to a restaurant. The user can also get further information about the restaurant. For example, the user might be able to find the days specials for a restaurant. For example for a bar the user can find what beers the bar has a draft, any specials or seasonal selections, and the user can also find out if the bar has a liquor license.

As in the other embodiments, this embodiment may enable operation over the same channel that sends traffic reports or using the other channels described herein.

Local information, for example information about multiple local restaurants, may be downloaded off a webpage, and stored on a USB device. Accordingly, up-to-date local information about the restaurants can be obtained from the USB device. In this embodiment, therefore, the menu and specials, may be updated at one time, and requested and displayed by the GPS device at some other time The general structure and techniques, and more specific embodiments which can be used to effect different ways of carrying out the more general goals are described herein.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, different wireless and wired techniques may be used with the devices, and any guidance device, whether it uses GPS or not, can be modified in this way.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method comprising:
   on a first computer, operating a Web page that obtains information about a first destination; and
   automatically transferring said information about said first destination addressed to a separate navigation device that is separate from said first computer in a way that provides information from which said separate navigation device navigates to said first destination,
   wherein said first computer obtains said information from said Web page on said first computer that also provides address information and allows mapping functions based on said first destination, said Web page being a publically-accessible page which is accessible by the public, and said Web Page on said first computer also obtaining second information that uniquely identifies said separate navigation device and sends said information to said separate navigation device,
   where said first computer obtains said information from said web page at a second time, said web page sends said information at a first time, and where said second time is at least two minutes after said first time.

2. A method as in claim 1, wherein said Web page also provides traffic guiding information.

3. A method as in claim 1, further comprising using a navigation device which has the capability of obtaining traffic information, and said automatically transferring comprises sending the information about the first destination over the same channel that carries the traffic information.

4. A method as in claim 1, wherein said automatically transferring comprises using a portable storage device to transfer the information from the first computer to the navigation device.

5. A method comprising:
   on a first computer, obtaining information about a first destination;
   automatically transferring said information about said first destination to a separate navigation device that is separate from said first computer in a way that allows said separate navigation device to navigate to said first destination; and,
   on said first computer, entering supplemental information about the first destination including at least one piece of information which indicates temporal information about when to guide to the first destination including entering information indicative of a time in the future and an indication to guide to the first destination starting at said time in the future, and said transferring transfers information to the separate navigation device indicating to navigate starting at said time in the future.

6. A method as in claim 5, wherein said first computer transfer said information at a first time, said separate navigation device receives the information at a second time, and where said second time is at least 2 minutes later than said first time.

7. A navigation device, comprising:
   a display and data entry keyboard;
   a connection to receive satellite information for navigation;
   a processor, that operates to plots a route based on said map data and said satellite information; and
   a connection for destination data that has been produced on a remote device that is remote from said data entry keyboard, and has been exported by said remote device at a first time, and imported by said connection at a second time subsequent to said first time, where said second time is at least two minutes after said first time.

8. A device as in claim 7, wherein said connection is a wireless connection.

9. A device as in claim 8, wherein said device includes the capability of receiving traffic reports, and said wireless connection is the same connection that is used to receive said traffic reports.

10. A device as in claim 7, wherein said connection is a wired connection to a portable electronic storage unit.

11. A device as in claim 8, wherein said wireless connection is accessed via a webpage that allows entry of information and searching based on said information.

12. A device as in claim 11, wherein said webpage enables determining mapping information.

13. A method, comprising:
   from a first computer, enabling determining an address on a webpage connected to the Internet; and
   from said first computer, producing a control on said webpage that allows exporting the address to a navigation guidance device, wherein said webpage further comprising, responsive to actuating said control, wirelessly exporting the address to the navigation guidance device, wherein said wirelessly exporting comprises sending the address to the guidance device at a time delayed relative to when sending is requested, so that the address arrives at the guidance device at least two minutes after it is sent.

14. A method as in claim 13, further comprising responsive to actuating said control, exporting the address to a portable hard drive, and subsequently, importing the address from the portable hard drive to a navigation device and guiding to the address using said navigation device.

15. A method as in claim 13, wherein said webpage is a search engine.

16. A method as in claim 13, wherein said webpage also produces mapping information that shows a location of the address.

* * * * *